United States Patent [19]

Jeon

[11] Patent Number: 4,812,926
[45] Date of Patent: Mar. 14, 1989

[54] AUTOMATIC TRACKING DEVICE FOR VCR WITH CAPSTAN MOTOR CONTROLLED BY COLOR SIGNAL

[75] Inventor: Jin S. Jeon, Kyunggi, Rep. of Korea
[73] Assignee: Gold Star Co., Ltd., Seoul, Rep. of Korea
[21] Appl. No.: 53,118
[22] Filed: May 22, 1987
[30] Foreign Application Priority Data May 22, 1986 [KR] Rep. of Korea ............... 1986-4011

[51] Int. Cl.⁴ .................... G11B 15/467; H04N 9/79
[52] U.S. Cl. .................... 360/70; 360/73.12; 358/329
[58] Field of Search ............ 360/70, 73, 77; 358/328, 329, 31, 14

[56] References Cited

U.S. PATENT DOCUMENTS

| 4,120,008 | 10/1978 | Metzger et al. ............ 360/77 |
| 4,513,311 | 4/1985 | Hirai et al. ............ 358/31 |
| 4,695,781 | 9/1987 | Ito ............ 360/73 |
| 4,731,674 | 3/1988 | Fukuda et al. ............ 358/328 |
| 4,748,518 | 5/1988 | Suzuki ............ 358/329 |

Primary Examiner—Alan Faber
Assistant Examiner—David L. Robertson
Attorney, Agent, or Firm—Birch, Stewart, Kolasch & Birch

[57] ABSTRACT

The present invention relates to an automatic tracking device for VCR designed to achieve an automatic tracking by making compensation for phase of capstan motor depending on the relative magnitudes of real color signal and cross talk signal among reproduced video signals. When video signal is reproduced, the envelope of real color signal and the envelope of cross talk signal are detected by separating a real color signal and a cross talk signal from among the reproduced video signals. Thus, signals proportional to the relative magnitudes of these two envelope detecting signals are outputted to capstan motor as signals making compensation for advancing phase or delaying phase to achieve an automatic tracking.

1 Claim, 2 Drawing Sheets

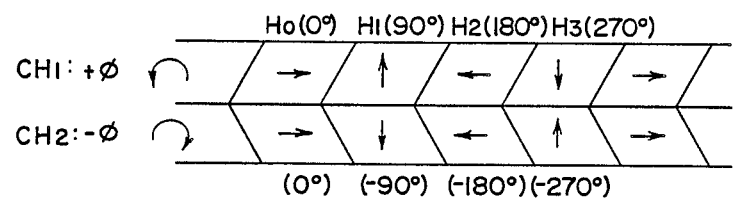
FIG. 1
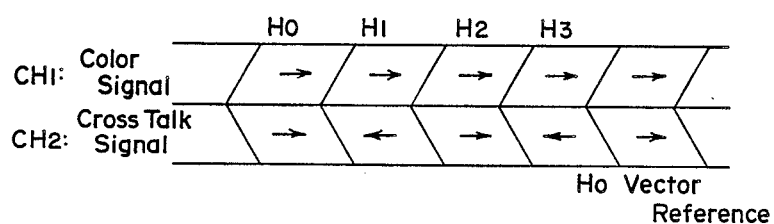
FIG. 2
FIG. 3(A)
FIG. 3(B)
FIG. 3(C)
FIG. 3(D)
FIG. 3(E)

AUTOMATIC TRACKING DEVICE FOR VCR WITH CAPSTAN MOTOR CONTROLLED BY COLOR SIGNAL

BACKGROUND OF THE INVENTION

1. Field of the Invention

The present invention relates to an automatic tracking device for video cassette recorder (hereinafter referred to as VCR) designed to enable its reproduction head to achieve an accurate tracking on the tape track during reproduction and, in particular, to an automatic tracking device for VCR designed to achieve an automatic tracking by making compensation for driving phase of capstan motor according to the relative magnitudes of real color signal and cross talk signal among reproduced video signals.

2. Description of the Prior Art

In the VCR, generally, tracking condition of every tape must be adjusted to make compensation for interchangeability when it is recorded. In the prior art, however, the tracking condition of VCR is adjusted by the manual operation of tracking adjuster of variable resistance installed on the outside thereof.

Accordingly, the prior art is defective not only because tracking must be manually adjusted by the user every time a tape is used and it is difficult to achieve an accurate tracking adjustment by the manual operation of adjuster but also because once tracking is adjusted, the adjusted condition is kept until it is manually adjusted again and so tracking is not achieved in the best condition when a tape is reproduced for many hours.

Recently, there is a device which finds the mean value of detected signal by continuously detecting the envelope of video signal outputted from the reproduction head at a regular period and adjusts tracking automatically according to the differences between two signal values by comparing the mean value with the signal value of envelope detected at a regular period.

However, such a conventional device involves an error in basic concept itself where tracking is automatically controlled in the fixed basic value, since the envelope of video signal outputted from reproduction head according to the brightness of picture, the running condition of tape and the essential property which a tape possesses undergoes a change occasionally. It also requires an addition of new part in order to cope with a change in envelope by sampling and holding the detected signal value of envelope during both vertical and horizontal synchronization, but it still poses a problem caused by the abnormality of travel system or the irregularity of tape condition.

Furthermore, it must be provided with an exclusively-used microcomputer because, in the microcomputer, it requires to calculate the detected signal of envelope continuously and, at the same time, to achieve an automatic tracking by drawing a comparison between the mean value of the detected signal of envelope and the detected signal value of envelope at a regular period.

SUMMARY OF THE INVENTION

Consequently, an object of the present invention is to provide an automatic tracking device for VCR designed to achieve an automatic tracking adjustment depending on the condition of video signal outputted from the reproduction head without manual tracking adjustment.

Another object of the present invention is to provide an automatic tracking device for VCR designed to achieve an automatic tracking in a simple structure by the use of microcomputer conventionally incorporated in the VCR without the need for a special microcomputer exclusively used in automatic tracking.

These objects of the present invention described hereinabove are attained when a real color signal and a cross talk signal are separated from among video signals outputted from the reproduction head and envelope is detected and when an automatic tracking is achieved by making compensation for phase of capstan motor depending on the magnitudes of the detected signals of two envelopes.

The present invention as described hereinabove is characterized by an accurate tracking at all times, seeing that it achieves an automatic tracking by continuously making compensation for the phase of capston motor depending on the magnitudes of cross talk volume and real color signal volume when video signal is reproduced.

BRIEF DESCRIPTION OF THE DRAWINGS

When an explanation is given by way of the drawings attached hereto, it comes as follows:

FIG. 1 is a color signal pattern diagram showing that color signal phase is shifted at an angle of 90° by channel in the VCR.

FIG. 2 is a vector diagram of reproduced color signal.

FIG. 3, consisting of 3(A) through 3(E), is a vector diagram showing the separation process of real color signal and cross talk signal.

DETAILED DESCRIPTION OF THE PREFERRED EMBODIMENT

Figure 4:
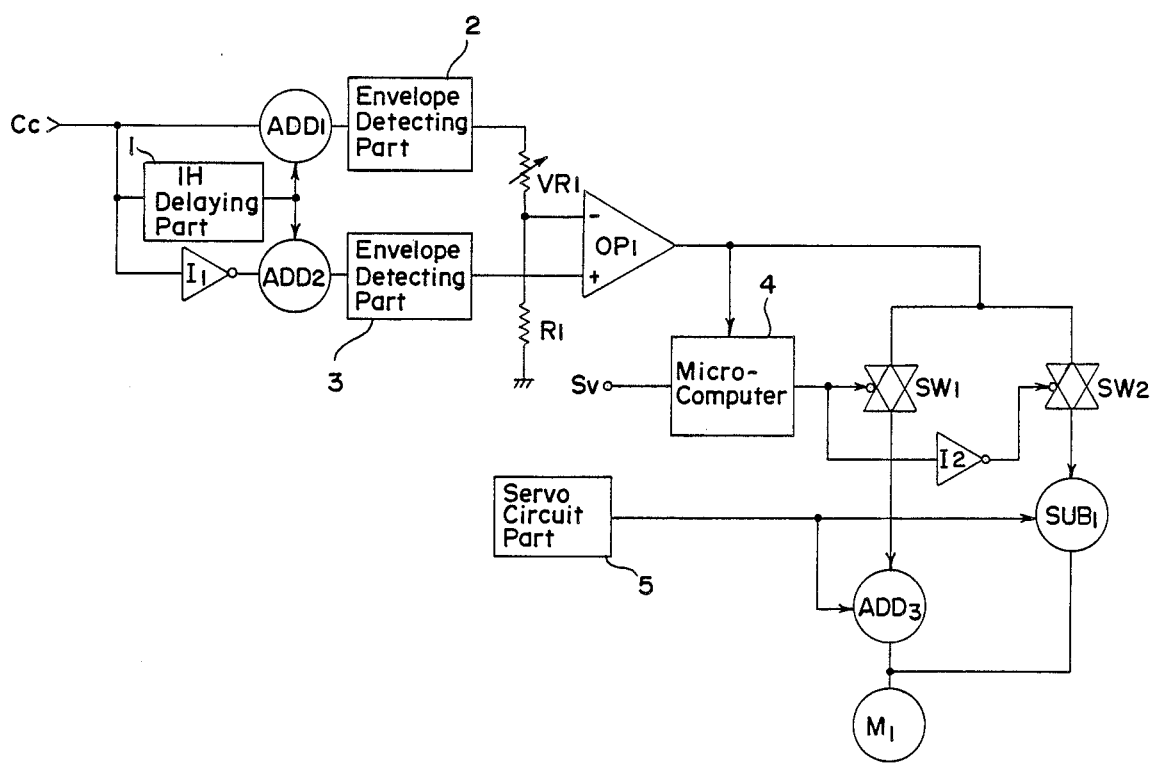
FIG. 4 is a circuit diagram of the automatic tracking device for VCR according to the present invention.

As illustrated, a color signal input terminal ($C_c$) is connected to an input terminal on one side of adder ($ADD_1$) and then to an input terminal of adder ($ADD_2$) through an inverter ($I_1$); the color signal input terminal ($C_c$) is connected to input terminals on the other side of both adders ($ADD_1$) ($ADD_2$) through IH delaying part (1); an output terminal of adder ($ADD_1$) is connected to a reversing input terminal of differential amplifier ($OP_1$) and to resistance ($R_1$) through envelope detecting part (2) and variable resistance ($VR_1$); an output terminal of adder ($ADD_2$) is connected to a non-reversing input terminal of differential amplifier ($OP_1$) through envelope detecting part (3); an output terminal of differential amplifier ($OP_1$) is connected to an input terminal of microcomputer (4) and to input terminals of analog switches ($SW_1$) ($SW_2$); an output terminal of microcomputer (4) is connected to a control terminal of analog switch ($SW_1$) and then to a control terminal of analog switch ($SW_2$) through as inverter ($I_2$); and output terminals of analog switches ($SW_1$) ($SW_2$) are connected to capston motor ($M_1$) through an adder ($ADD_3$) and a subtracter ($SUB_1$) whose input terminals on one side are connected to an output terminal of servo circuit part (5). The reference numeral $S_v$ on the drawings is a vertical synchronous signal terminal.

In the next place, the functional effect of the present invention constituted in such a manner as described hereinabove will be explained.

FIG. 1 shows a color signal recording pattern. It shows that signal phases in two channels (CH$_1$) (CH$_2$) are respectively shifted at an angle of 90°.

FIG. 2 shows reproduced color signal vectors. Channel (CH$_1$) shows a color signal vector and channel (CH$_2$) a cross talk vector.

Accordingly, the vector of color signal which is inputted to a color signal input terminal (C$_c$) shown in FIG. 4 and the vector of cross talk contained in the color signal become as illustrated in (A) of FIG. 3. Thus, the signal inputted to the color signal input terminal (C$_c$) is applied to an input terminal on one side of adder (ADD$_1$) and delayed in the IH delaying part for a period of one horizontal synchronization as illustrated in (B) of FIG. 3 and then applied to an input terminal on the other side of adder (ADD$_1$). Accordingly, as illustrated in (C) of FIG. 3, a cross talk signal is removed in a counter-phase condition and only real color signal is outputted to the output terminal of adder (ADD$_1$). On the other hand, the signal inputter to a color signal input terminal (C$_c$) is reversed in the inverter (I$_1$), as illustrated in (D) of FIG. 3, and applied to an input terminal on one side of adder (ADD$_2$). To an input terminal on the other side of adder (ADD$_2$), the signal which is delayed for a period of one horizonted synchronization in the IH delaying part is applied as described hereinabove. Consequently, as illustrated in (E) of FIG. 3, color signal is removed in a counter-phase condition and only cross talk signal is outputted to the output terminal of adder (ADD$_2$).

Thus, only real color signal is outputted to the output terminal of adder (ADD$_1$), and then is applied to a reversing input terminal through variable resistance (VR$_1$) after the envelope of real color signal being detected in the envelope detecting part (2). To the output terminal of adder (ADD$_2$), only cross talk signal is outputted, and the envelope of cross talk signal is applied to a non-reversing input terminal of differential amplifier (OP$_1$) after being detected in the envelope detecting part (3).

Consequently, when cross talk signal volume exceeds a predetermined rate of real color signal volume, a high potential signal which is proportional thereto is outputted to the output terminal of differential amplifier (OP$_1$) and applied as a signal for making compensation for phase of capstan motor (M$_1$). When real color signal volume becomes smaller or cross talk signal volume becomes larger, the output of differential amplifier (OP$_1$) becomes larger and phase compensation grows in volume in proportion thereto. In case real color signal volume becomes larger or cross talk signal volume becomes smaller, the output of differential amplifier (OP$_1$) becomes smaller and phase compensation declines in volume.

As to the relative ratio of cross talk signal volume to real color signal volume, it can be set by adjusting the value of variable resistance (VR$_1$). So it is possible to apply it to a wide variety of models which are different in head width.

Thus, the signal outputted from differential amplifier (OP$_1$) is applied to the input terminal of microcomputer (4) and the input terminals of analog switches (SW$_1$) (SW$_2$), and analog switch (SW$_1$) or analog switch (SW$_2$) is energized by deciding at this time whether the phase should be controlled to go ahead or to go behind in the microcomputer (4). In other words, when the vertical synchronous signal of vertical synchronous signal terminal (S$_v$) is applied to microcomputer (4), it is detected, on the basis of the time when the vertical synchronous signal comes to an end, whether the output signal of differential amplifier (OP$_1$) has come to an end or not. If the output signal of differential amplifier (OP$_1$) has come to an end at this time, a high potential signal, which is a advancing phase control signal, is outputted from microcomputer. If the output signal of differential amplifier (OP$_1$) has not come to an end, a low potential signal, which is a delaying phase control signal, is outputted from microcomputer (4).

Since there is a difference of 1.5 H (in the case of 2-hour model) - 0.5 H (in the case of 6-hour model) per track between the time when a vertical synchronization comes to an end and the time when a color signal is detected for the first time in the Helical Scan System, it is possible to determine if it is a front track cross talk or a rear track cross talk.

Accordingly, when a high potential signal, which is an advancing phase control signal, is outputted from microcomputer (4), it turns analog switch (SW$_1$) on and, at the same time, turns analog switch (SW$_2$) off by reversing to a low potential signal in the inverter (I$_1$). Thus, the output signal of differential amplifier (OP$_1$) is added to the output signal of servo circuit part (5) in the adder (ADD$_3$) through analog switch (SW$_1$) and so compensation is made for the phose of capstan motor to enable it to go ahead.

On the other hand, when a low potential signal, which is a delaying phase control signal, is outputted from microcomputer (4), it turns analog switch (SW$_1$) on and, at the same time, turns analog switch (SW$_2$) on by reversing to a high potential signal in the inverter (I$_1$). Thus, the output signal of differential amplifier (OP$_1$) is subtracted from the output signal of servo circuit part (5) in the subtracter (SUB$_1$) and so compensation is made for the phase capstan motor to enable it to go behind.

As hereinabove described in detail, the present invention continuously makes compensation for momentary phase of capstan motor depending on the relative ratio of the cross talk signal volume of the real color signal volume. So tracking is automatically achieved and phase compensation volume can be designed so as not to exist in the basic cross talk which is determined by track width and head width. It is also applicable to a 2-hour model and a 6-hour model adopting a gain changing design of the differential amplifier (OP$_1$). As compensation is made for phase while scanning a track from beginning to end, tracking of head is automatically achieved in an accurate manner.

What is claimed is:

1. An automatic VCR tracking device comprising a color signal input terminal (C$_c$) connected directly to an input terminal on one side of a first adder (ADD$_1$) and through an inverter (I$_1$) to an input terminal on one side of a second adder (ADD$_2$) and, at the same time, to the other input terminals of both said first and second adders (ADD$_1$, ADD$_2$) through a IH delaying part (1), the output terminal of the first adder (ADD$_1$) being connected to the reversing input of a differential amplifier (OP$_1$) through a first envelope detecting part (2) and variable resistance (VR$_1$), the output terminal of the second adder (ADD$_2$) being connected to the non-reversing input of said differential amplifier (OP$_1$) through a second envelope detecting part (3), the output terminal of the differential amplifier (OP$_1$) being connected to a microcomputer (4) and, at the same time, to the first input terminals of a third adder (ADD$_3$) and a subtractor (SUB$_1$) through analog switches (SW$_1$, SW$_2$) which are controlled by said microcomputer (4), and whose second input terminals are connected to the output terminal of a servo circuit part (5), the output terminals of said third adder (ADD$_3$) and said subtractor (SUB$_1$) being connected to a capstan motor.

* * * * *